(12) United States Patent
Jeng et al.

(10) Patent No.: US 10,598,087 B2
(45) Date of Patent: Mar. 24, 2020

(54) INTAKE/OUTLET PIPE OPTIMIZATION METHOD FOR ROTARY ENGINE

(71) Applicant: National Chung-Shan Institute of Science and Technology, Taoyuan (TW)

(72) Inventors: Dun-Zen Jeng, Taoyuan (TW); Ming-Chun Hsieh, Taoyuan (TW); Chih-Chuan Lee, Taoyuan (TW); Ting-Hua Chieh, Taoyuan (TW)

(73) Assignee: NATIONAL CHUNG-SHAN INSTITUTE OF SCIENCE AND TECHN, Taoyuan (TW)

( * ) Notice: Subject to any disclaimer, the term of this patent is extended or adjusted under 35 U.S.C. 154(b) by 196 days.

(21) Appl. No.: 15/978,081

(22) Filed: May 11, 2018

(65) Prior Publication Data
US 2018/0258844 A1    Sep. 13, 2018

Related U.S. Application Data

(63) Continuation-in-part of application No. 15/077,903, filed on Mar. 22, 2016, now abandoned.

(51) Int. Cl.
| | |
|---|---|
| G01M 15/02 | (2006.01) |
| F02B 53/04 | (2006.01) |
| F01C 21/18 | (2006.01) |
| F01C 20/28 | (2006.01) |
| F02B 55/08 | (2006.01) |
| F02B 55/02 | (2006.01) |
| F02B 53/02 | (2006.01) |
| F01C 1/22 | (2006.01) |

(52) U.S. Cl.
CPC ............. *F02B 53/04* (2013.01); *F01C 20/28* (2013.01); *F01C 21/186* (2013.01); *F02B 53/02* (2013.01); *F02B 55/02* (2013.01); *F02B 55/08* (2013.01); *G01M 15/02* (2013.01); *F01C 1/22* (2013.01); *F04C 2240/806* (2013.01); *Y02T 10/17* (2013.01)

(58) Field of Classification Search
CPC ..... G01M 15/02; G01M 15/09; G01M 15/044
USPC ............... 73/114.13, 114.14, 114.15, 114.31, 73/114.69
See application file for complete search history.

(56) References Cited

U.S. PATENT DOCUMENTS

| | | | | |
|---|---|---|---|---|
| 4,592,310 | A * | 6/1986 | Hitomi | F02B 27/0263 123/184.55 |
| 5,016,583 | A * | 5/1991 | Blish | F01L 1/02 123/190.7 |
| 5,119,778 | A * | 6/1992 | Corbett | F02M 35/10052 123/216 |

(Continued)

*Primary Examiner* — Eric S. McCall

(57) ABSTRACT

An intake/outlet pipe optimization method for a rotary engine, comprising the steps of: (A) providing a rotary engine; (B) providing a simulation software package, to perform a series of simulations for the rotary engine according to different combinations of a pipe length, a pipe diameter, a pipe shape and a pipe angle, to determine an optimal combination of the pipe length, the pipe diameter, the pipe shape, and pipe angle, to obtain an optimal power output for the rotary engine; and (C) performing tests for the rotary engine, by utilizing the optimal combination of the pipe length, the pipe diameter, the pipe shape, and pipe angle obtained in step (B), to obtain a test optimized power output for the rotary engine.

8 Claims, 8 Drawing Sheets

(56) References Cited

U.S. PATENT DOCUMENTS

| | | | | |
|---|---|---|---|---|
| 6,167,857 B1* | 1/2001 | McCord | F02M 35/10275 | |
| | | | | 123/184.53 |
| 6,564,767 B1* | 5/2003 | Reese | F01N 13/10 | |
| | | | | 123/184.53 |
| 6,901,898 B1* | 6/2005 | Oberg | F02B 27/0284 | |
| | | | | 123/184.55 |
| 2003/0136120 A1* | 7/2003 | Piekarski | F01N 13/08 | |
| | | | | 60/313 |
| 2003/0145584 A1* | 8/2003 | Ciray | F01N 1/02 | |
| | | | | 60/312 |
| 2003/0145585 A1* | 8/2003 | Uhler | F01N 1/02 | |
| | | | | 60/312 |
| 2007/0261398 A1* | 11/2007 | Williams | F02B 27/0236 | |
| | | | | 60/313 |
| 2008/0149061 A1* | 6/2008 | Rauner | F02B 27/0263 | |
| | | | | 123/184.55 |
| 2009/0084336 A1* | 4/2009 | Friedl | F02M 35/10262 | |
| | | | | 123/184.55 |
| 2009/0165740 A1* | 7/2009 | Kubo | F02M 35/10039 | |
| | | | | 123/184.55 |
| 2009/0165741 A1* | 7/2009 | Kubo | F02M 35/10039 | |
| | | | | 123/184.55 |
| 2009/0250025 A1* | 10/2009 | Kitadani | F02D 9/1065 | |
| | | | | 123/90.15 |
| 2010/0224159 A1* | 9/2010 | Prior | F01N 1/006 | |
| | | | | 123/184.53 |
| 2015/0260088 A1* | 9/2015 | Jeng | F02B 53/04 | |
| | | | | 418/1 |

* cited by examiner

INTAKE/OUTLET PIPE OPTIMIZATION METHOD FOR ROTARY ENGINE

CROSS-REFERENCE

This application is a Continuation-In-Part (CIP) application of a pending application Ser. No. 15/077,903 filed on Mar. 22, 2016, entitled "INTAKE/OUTLET PIPE OPTIMIZATION METHOD FOR ROTARY ENGINE".

BACKGROUND OF THE INVENTION

Field of Invention

The present invention relates to an intake/outlet pipe optimization method for a rotary engine, and particularly to the method utilizing a software simulation package, to simulate, test, and obtain an optimized combination of the pipe length, pipe diameter, pipe shape, and pipe angle, to achieve an optimized power output for the rotary engine.

The Prior Arts

In general, a conventional rotary engine has the advantages of high power-to-weight ratio, small volume, fewer components, and compact structure, and the intake and outlet pipes of the engine are smooth pipes. The engine divides a cylinder into three air chambers by a triangular rotor. When the rotor rotates a round, the three air chambers can complete a cycle including air intake, compression, combustion and exhaust to produce a power output. When the air in the air chamber encounters a spark, the combustion takes place quickly, and the generated heat energy drives the air to produce a strong pressure and output a power. Factors affecting the performance of the engine include intake and exhaust timing arrangement, ignition time, cylinder volume, air-fuel ratio, etc. Unlike a general piston engine that can control the intake and exhaust timing by adjusting the intake/exhaust valves to achieve an optimized status, the power output of the rotary engine is confined to the arrangement of its fixed geometric appearances and cannot be changed without hardware modification.

In general, the intake status is related to the pressure difference between the intake pipe and the air-intake chamber. In the intake stage of an engine, the more the fresh air, the better. Therefore, the pressure of the intake pipe is better at a higher level than that of the air chamber, so that the air from the intake pipe can enter into the air chamber. On the other hand, if the pressure is higher in the air chamber than the intake pipe, the air in the chamber will flow reversely into the intake pipe, meaning that the air intake process temporarily stops, or even more the air flows out from the intake pipe, and thus resulting in an insufficient air intake.

Presently, most of the methods of enhancing the engine performance emphasizes on the appearance of the combustion chamber or the ignition timing, and thus incurring a higher cost and a longer time for modifying the engine body or using an additional turbocharger to provide a higher inlet pressure and a greater air intake to enhance the performance. However, a too-high pressure in the intake pipe will increase the fuel consumption rate, and a portion of fuel gas is discharged from the outlet pipe, and thus failing to comply with the economic and environmental protection requirements.

Further, in the conventional technology, for example, as disclosed in U.S. 2007/0261398A1. For which, power output and efficiency of an internal combustion engine can be improved by tuning the properties of the intake and exhaust system, such as the length of the intake fluid path. (refer to Abstract, (0002), (0005)) However, in real life, the installation sites are quite often subjected to rather stringent space limitations, so that the change of the lengths of the intake and/or exhaust fluid paths is not sufficient to meet the installation requirements of an engine, and not able to enhance the power output of an engine as required.

Therefore, presently, the design and performance of the intake and outlet pipe for a rotary engine is not quite satisfactory, and it leaves much room for improvement.

SUMMARY OF THE INVENTION

In view of the shortcomings of the prior art, a primary objective of the present invention is to overcome the shortcomings by providing an intake/outlet pipe optimization method for a rotary engine. Wherein the pressure wave in the intake pipe together with the pressure in the air chamber of the rotary engine are adequately adjusted by the appearance alternation of the intake/outlet pipe to improve the air intake status of the engine and enhance the power output performance. Without changing the design of engine body, the shape, length, diameter, and angle of the intake/outlet pipe can be adjusted. Compared with the conventional straight intake/outlet pipe, the shape of the intake pipe of the invention is tapered to adjust the pressure of the air pipe and increase the air intake, to enhance the engine power output.

After the exhaust air in the chamber is discharged, the volume of that chamber is gradually increasing, and the engine is situated at a negative pressure status (less than ambient pressure) and starts the air intake process again. The pressure of the intake pipe is greater than the negative pressure of the chamber, so that the air in the intake pipe can flow into the air chamber. As the chamber volume is about to reach its maximum and start the compression process, the pressure rises and slows down the chamber air-intake process, and the inertia of airflow in the intake pipe builds up higher pressure at the engine side. The negative pressure in the chamber as well as the high pressure in the intake pipe during the air-intake process will travel along the pipe to the other end, ambient end or engine port end, and reflect backward to form pressure wave motion in the pipe. Pipe wave motion has significant influence on the air-intake process. If the intake pipe pressure stays at a higher level while the chamber is in a negative pressure condition, it will be beneficial for air intake. To take advantages of this, the pressure wave motion in the intake pipe that goes with some certain frequency and amplitude at a specific rotational speed can be changed by the geometric feature of the air intake pipe.

To achieve the objective mentioned above, the present invention provides an intake/outlet pipe optimization method for a rotary engine, the method comprises the following steps:

(A) providing a rotary engine; (S10)

(B) providing a simulation software package, to perform a series of simulations for the rotary engine according to different combinations of a pipe length, a pipe diameter, a pipe shape and a pipe angle, to determine an optimal combination of the pipe length, the pipe diameter, the pipe shape, and pipe angle, to obtain an optimal power output for the rotary engine; and (S20)

(C) performing tests for the rotary engine, by utilizing the optimal combination of the pipe length, the pipe diameter, the pipe shape, and pipe angle obtained in step (B), to obtain a test optimized power output for the rotary engine. (S30).

In step (B) mentioned above, the simulation software package is a WAVE software product of Ricardo (website address: https://www.google.com/tw/search?source=hp&ei), and it can also be referred to as simulation software package WAVE hereinafter for easy reference. The introduction, explanation, and other related information about WAVE can be obtained from the web site.

Through using the simulation software package, the determination of the optimal combination of the pipe length, the pipe diameter, the pipe shape, and pipe angle, and hence an optimized power output for the rotary engine can be more efficient, accurate, and time saving. Since a series of trials and errors for obtaining the optimized power output can be skipped and omitted, while the correct results can be obtained in a very short period of time.

In the method mentioned above, the shape of the intake/outlet pipe has a taper angle from the ambient side to the engine side. From the air flow direction point of view, the shape of intake pipe has a relatively lager cross-section area at upstream, ambient side. Consersely, the shape of the outlet pipe has a relatively smaller cross-section area at the upstream, the engine side.

The alternation of the pipe taper angle can be ranged from 0 degree to 50 degrees, that could have several intervals in between. The pipe length range can be from 100 mm to 1500 mm, that could have several intervals in between.

Different combinations of the pipe length, pipe diameter, pipe shape, and pipe angle described in the step (B) can be used to adjust the amplitude and frequency of the pressure wave in the intake pipe in accordance with the instantaneous chamber pressure, the engine can be situated at a proper or better air intake status, and the mass of air intake will be increased to enhance the performance.

In the present invention, the intake/outlet pipe optimization method for a rotary engine is realized through an intake/outlet pipe optimization rotary engine, that includes: a rotary engine body, including an intake pipe coupled to engine intake port, and an outlet pipe coupled to the engine outlet port, so that the air flows into the intake pipe to the engine body, and then chemical reactions occur through combustion to produce power, and exhaust gas is discharged from the outlet pipe to the ambient; wherein the end connecting the pipe with the engine body is an engine side, and the other end an intake side.

Wherein, the design of the intake pipe or the outlet pipe is the same as that of the intake/outlet pipe optimization method for a rotary engine, and the pressure wave motion in the pipe is adjusted by the pipe length, pipe diameter, pipe shape, and pipe angle to achieve a better air intake condition.

Wherein, the pipe shape of the intake pipe or the outlet pipe is in form of a segmented or continuous curve, and these pipes are substaintially conical pipes.

In the present invention, the rotary engine power output performance can be enhanced by a design that optimizes the pipe length, pipe diameter, pipe shape, and pipe angle of the intake/outlet pipe to provide an optimized combination of pipe length, pipe diameter, pipe shape, and pipe angle for various intake/outlet pipes of the rotary engine, in achieving an optimized power output for the rotary engine.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detail descriptions.

DETAILED DESCRIPTION OF THE INVENTION

Figure 1:
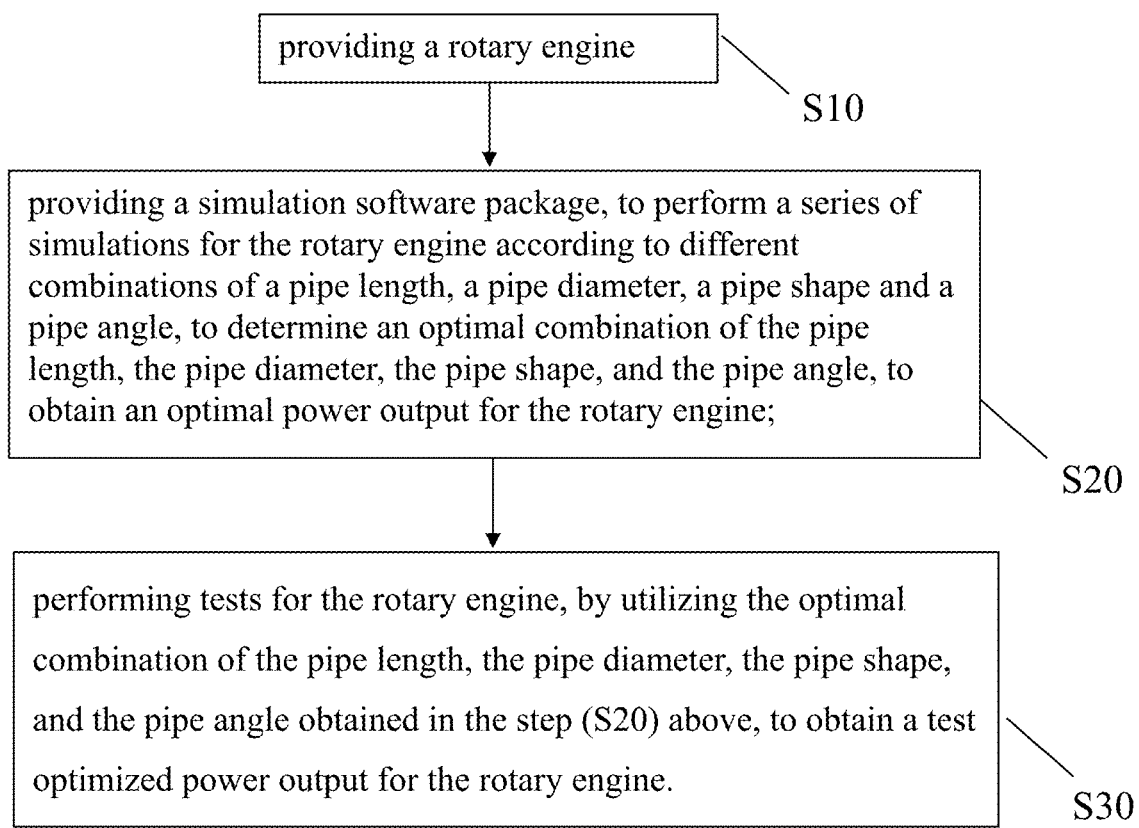
FIG. 1 is a flow chart of an intake/outlet pipe optimization method for a rotary engine according to the present invention.

The related drawings in connection with the detailed descriptions of the present invention to be made later are described briefly as follows, in which:

Refer to FIG. 1 for the flow chart of an intake/outlet pipe optimization method for a rotary engine according to the present invention, the method comprises the following steps:

(A) providing a rotary engine; (S10)

(B) providing a simulation software package, to perform a series of simulations for the rotary engine according to different combinations of a pipe length, a pipe diameter, a pipe shape and a pipe angle, to determine an optimal combination of the pipe length, the pipe diameter, the pipe shape, and pipe angle, to obtain an optimal power output for the rotary engine; and (S20)

(C) performing tests for the rotary engine, by utilizing the optimal combination of the pipe length, the pipe diameter, the pipe shape, and pipe angle obtained in step (B), to obtain a test optimized power output for the rotary engine. (S30)

Figure 4:
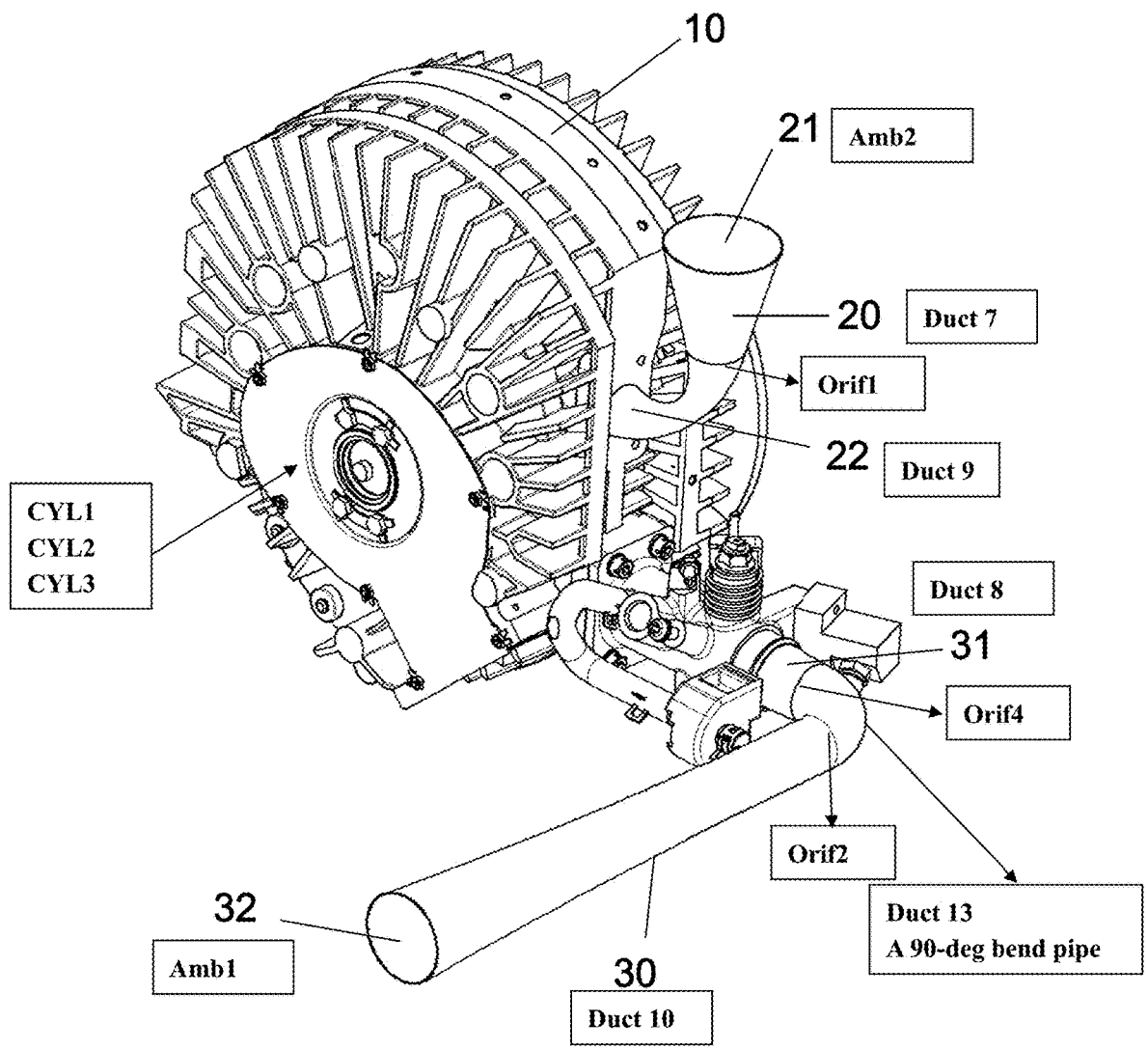
FIG. 4 is a perspective view of an intake/outlet pipe optimization rotary engine according to the present invention.

Refer to FIG. 4 for a perspective view of an intake/outlet pipe optimization rotary engine according to the present invention. Also, refer to FIG. 5 for a function block diagram of the simulation software package.

Figure 5:
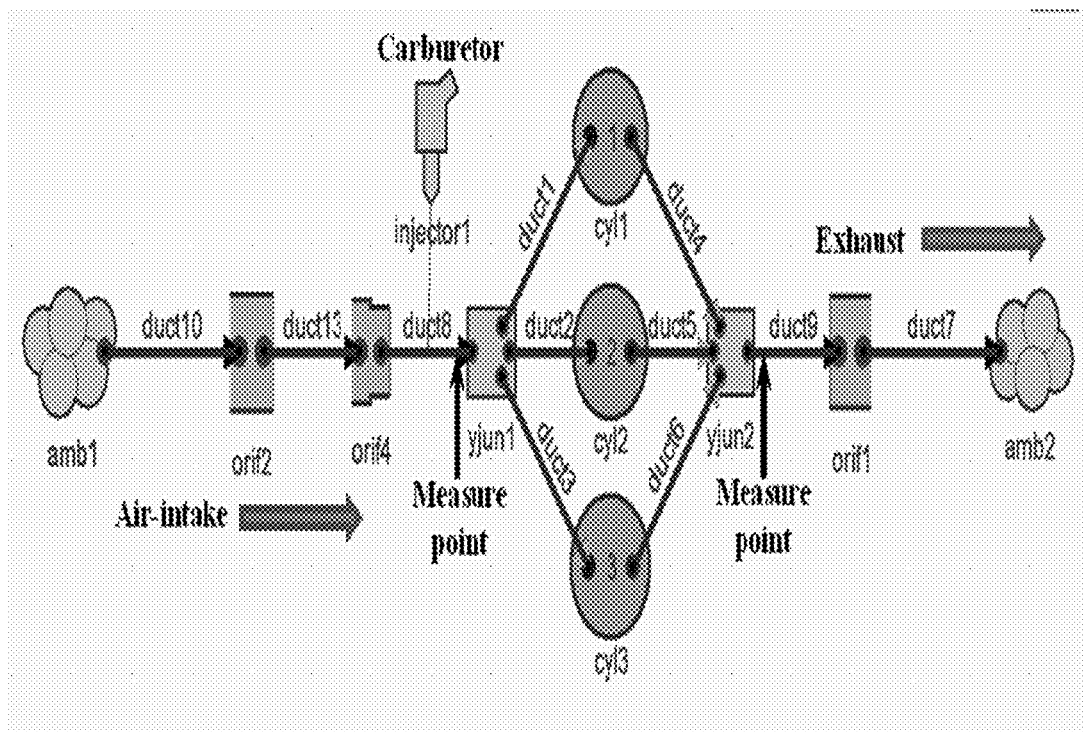
FIG. 5 is a function block diagram of the simulation software package according to the present invention.

By the way, it is worthy to note that, the simulation software package WAVE of Ricardo is a one-dimensional piston engine analysis software, having the parameters of combustion model, pipe wave motions, performance prediction, etc. As shown in FIG. 5, the simulation software package includes the following elements (as indicated by bold face and underline). To simulate a rotary engine with a piston engine properly and accurately, three cylinders named CYL are needed in accordance with the three chambers of a rotary engine, and also both engines' equivalence in geometry, crank angle, ignition timing, volume variation, air intake/exhaust timing, and fuel injection timing are all well calculated prior to the analysis. In addition:

Element Duct (duct) means to setup pipe for both air-intake and exhaust, including pipe diameters in both ends, surface roughness for different materials, bending angle, and length. Element Orif (orifice) is for different pipes connection. Wave will do the pressure loss calculation internally based on the area variations and connection type. Element Injector (fuel injection) with alternative setups for fuel injection timing, location, fuel type, injection type and also fuel rate. Element YJUN (Y-type Junction for multiple pipe connections) is needed for a three-cylinder piston engine to simulate a rotary engine. Though a rotary engine doesn't have valves, the ports on circumferential side decide the timings of air intake and that of exhaust via crank angle. Junction is the port volume or space (inner surface to outer surface for pipe connection) of a rotary engine in accordance with a real pipe manifold of a 3-cylinder piston engine. Element AMB (ambient) means open ends to the ambient.

Further, refer to FIG. 4 for of elements of real rotary engine corresponding to the elements of the simulation software package (WAVE) of FIG. 5.

In the present invention, in order to obtain optimized power output, the simulations of a simulation software package (WAVE) for a rotary engine can be performed in two parts as explained as follows. The first part is to test and verify the simulation software package is correct, and can be performed accurately to obtain a correct simulation result; while the second part is to use the simulation software package to obtain an optimized power output for the rotary engine.

The First Part

For the first part, before the simulation software package being used to run simulations for the rotary engine, the simulation software package (WAVE) must itself be tested and verified that its simulation results are correct, and it can be performed accurately. To achieve this objective, a three-cylinder engine model is adopted to simulate the three chambers of a real rotary engine as shown in FIG. 5. Wherein, manifolds of engine intake and exhaust pipes are set to zero-length. To identify the settings, test data and blue print of a real rotary engine are used as a benchmark.

Figure 6:
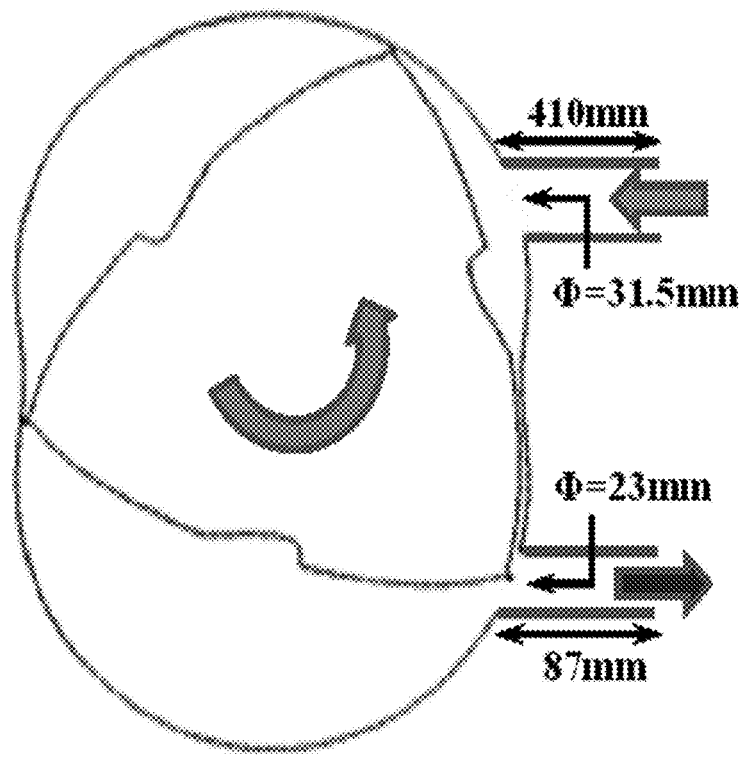
FIG. 6 is a schematic diagram for a simplified geometry of the real rotary engine used in the first part of simulation according to the present invention.

Refer to FIG. 6 for a schematic diagram for a simplified geometry of the real rotary engine used in the first part of simulation according to the present invention. As shown in FIG. 6, the intake duct length is 410 mm, the exhaust pipe is 87 mm, and the working volume of the rotary engine is 208 cc. The engine test is conducted at sea level 25° C. at 6800 rpm. Ignition timing to crank angle is at 16° before TDC, and Air/Fuel Raton is 12.5 with $C_8H_{18}$. Valve timing is based on the measurement of the intake/exhaust port positions in a cycle of 1080° in terms of 760° in a 4-stroke cylinder engine.

In the performance analysis, the results of the WAVE simulation with proper model settings show that the average performance data is quite close to the test data (about 5% in tolerance) as shown in Table 1, and that indicates that the simulation software package (WAVE) is tested and verified that its simulation results are correct, and it can be performed accurately.

TABLE 1

Comparison of WAVE simulation and test data

| OUTPUT | UNIT | EXP | WAVE | ERROR |
|---|---|---|---|---|
| FUEL RATE | kg/h | 7.91 | 7.52 | −4.89% |
| BRAKE WORK | kW | 22.6 | 22.6 | 0.18% |
| BSFC | g/(kw * h) | 350 | 332.3 | −5.06% |
| BRAKE TORQUE | N · m | 31.5 | 31.8 | 0.92% |
| BMEP | bar | n/a | 9.620 | |
| Pmax | bar | 38.02 | 38.46 | 1.16% |
| CA @Pmax | deg | 572 | 580 | |

Wherein, BSFC means brake specific fuel consumption; BMEP means brake mechanical power; Pmax means the maximum pressure in the pipe; and CA@Pmax means pipe angle at the maximum pressure.

The Second Part (1) Utilizing a simulation software package (WAVE), to perform a series of simulations for the rotary engine according to different combinations of a pipe length, a pipe diameter, a pipe shape and a pipe angle, to determine an optimal combination of the pipe length, the pipe diameter, the pipe shape, and pipe angle, to obtain an optimal power output for the rotary engine.

(2) Performing tests for the rotary engine, by utilizing the optimal combination of the pipe length, the pipe diameter, the pipe shape, and pipe angle obtained in step (1) above on a rotary engine, to obtain a test optimized power output for the rotary engine.

In the descriptions above, to achieve the purpose of the present invention, the first part needs to be performed for only once to verify the simulation software package is correct and accurate, while the second part can be performed according to the actual requirements.

The pressure wave of the intake pipe and the outlet pipe and the pressure of the air chamber of the engine are adjusted according to the method mentioned above to achieve smooth air intake and exhaust by the intake/outlet pipe optimization rotary engine, so as to increase the air intake and provide smooth intake and exhaust for the engine, so as to enhance the performance of the rotary engine.

In obtaining the optimal power output for a rotary engine, it is important that, air intake must be sufficient to enhance the performance of the rotary engine. As such, the intake air is not allowed to flow to the exhaust side to interfere with the exhaust air, to decrease the air intake; while the exhaust air is not allowed to flow to the intake side to interfere with the intake air, to decrease the air intake. Another objective of the present invention is to redress and improve the drawbacks that could occur in the conventional technology, as explained as follows.

Figures 7A, 7B:
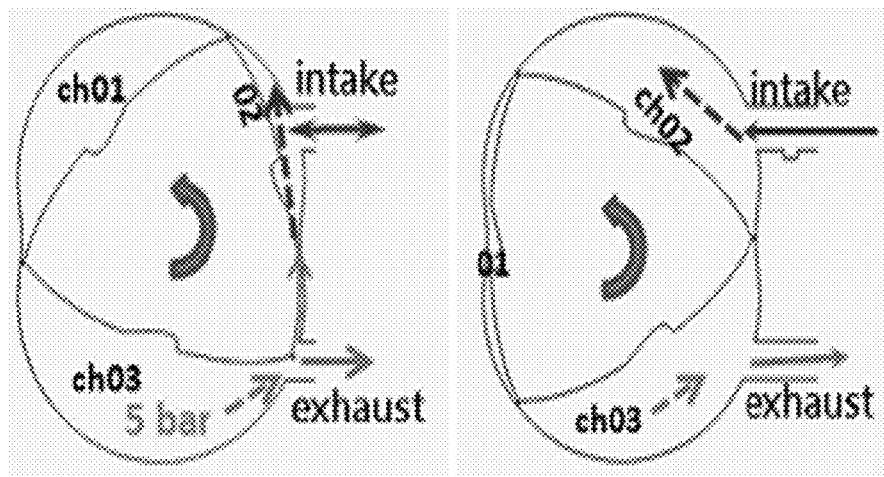
FIGS. 7(a) to 7(d) are schematic diagrams of a rotary engine having a rotor enclosed by three air chambers according to the present invention.
Figures 7C, 7D:
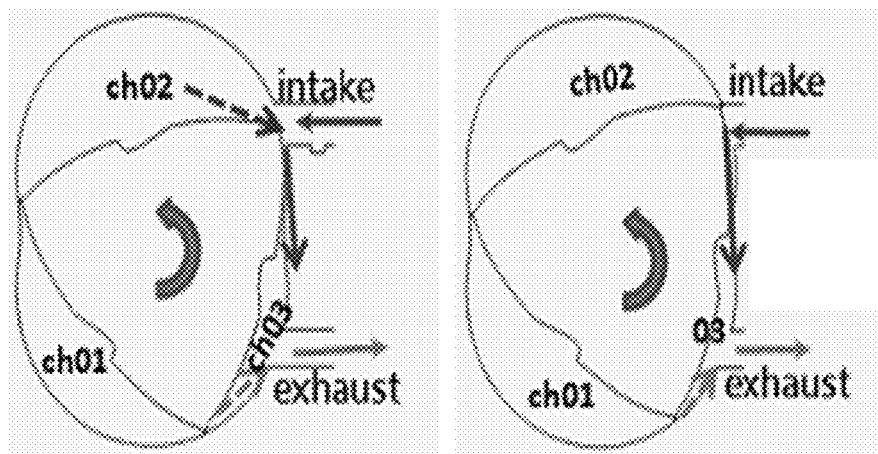

Refer to FIGS. 7(a) to 7(d) for schematic diagrams of operation for a rotary engine having a rotor enclosed by three air chambers according to the present invention. As shown in FIGS. 7(a) to 7(d), when the rotor is rotated counterclockwise as shown by an arrow, the volumes of the respective air chamber 1 (ch 1), air chamber 2 (ch 2), and air chamber 3 (ch 3) are changed accordingly. For the state as shown in FIG. 7(a), part of the exhaust air flows into the intake side to interfere with the intake air, so that the intake air is decreased, thus the rotary engine is run less efficiently. Next, as shown in FIG. 7(b), no exhaust air flows into the intake side to interfere with the intake air, so that the rotary engine can be run smoothly and efficiently. Then, as shown in FIG. 7(c), part of the intake air flows into the exhaust side to interfere with the exhaust air, so that the intake air is decreased, so that the rotary engine is run less efficiently. Finally, as shown in FIG. 7(d), part of the intake air flows into the exhaust side to interfere with the exhaust air, so that the intake air is decreased, and the rotary engine is run less efficiently.

For the second part of simulation, in the following, refer to FIGS. 8(a) to 8(c) for the compiled test results of running the rotary engine to indicate respectively the power output (work) distribution for (1) different intake diameter vs intake length, (2) BSFC for different intake diameter vs intake length, and (3) convergent intake duct vs duct diameter.

Figure 8A:
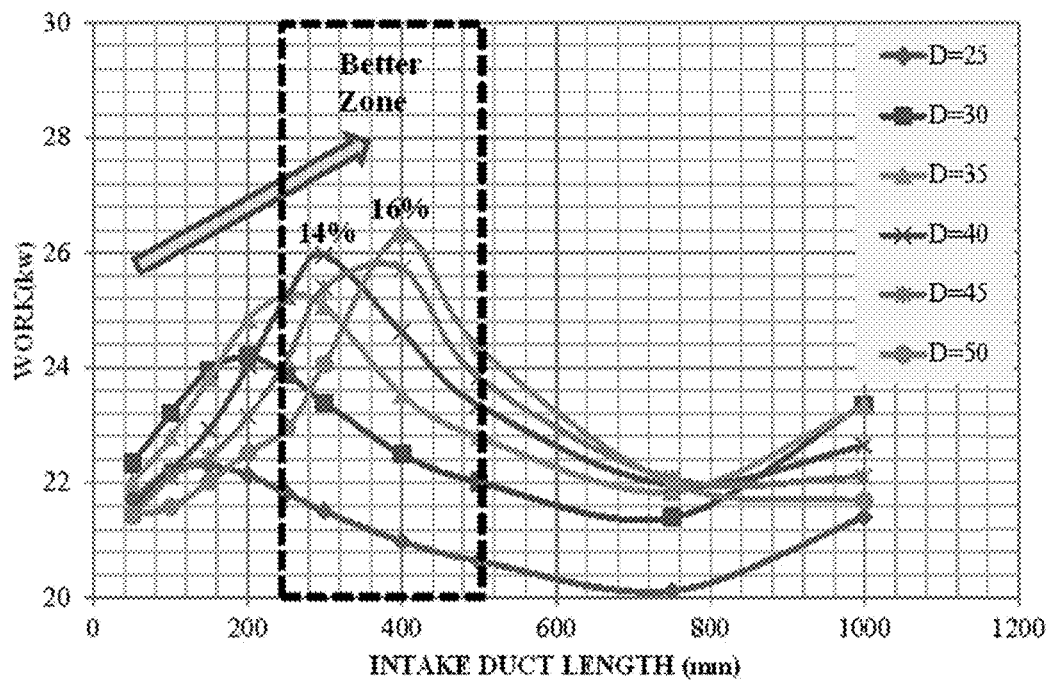
FIGS. 8(a) to 8(c) are the compiled test results of running the rotary engine to indicate respectively the power output (work) distribution for (1) different intake diameter vs intake length, (2) BSFC for different intake diameter vs intake length, and (3) convergent intake duct vs duct diameter according to the present invention.
Figure 8B:
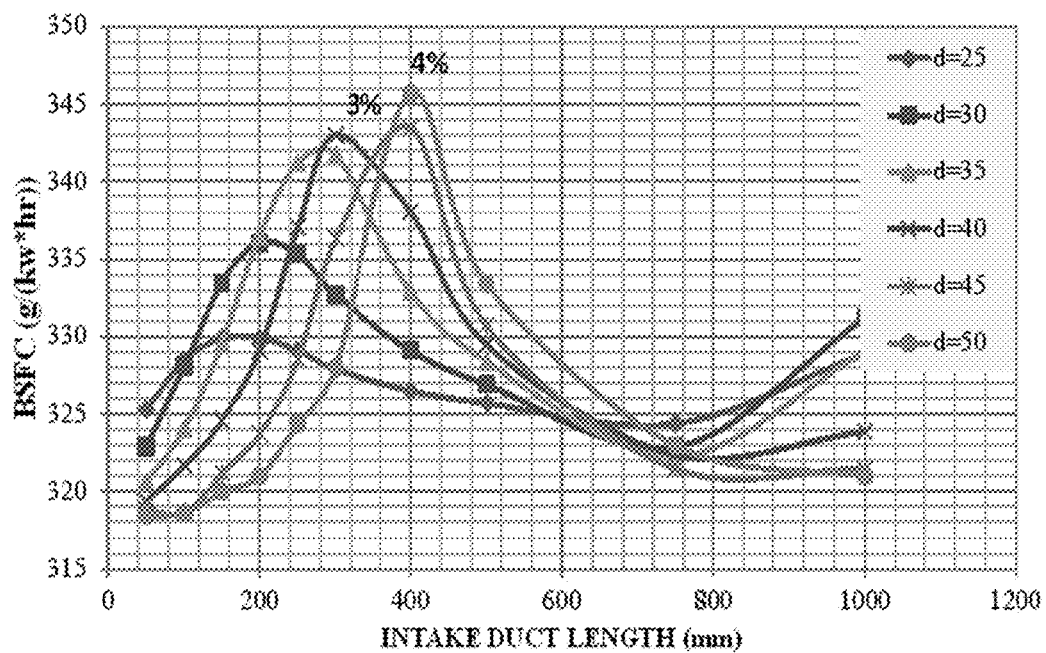
Figure 8C:
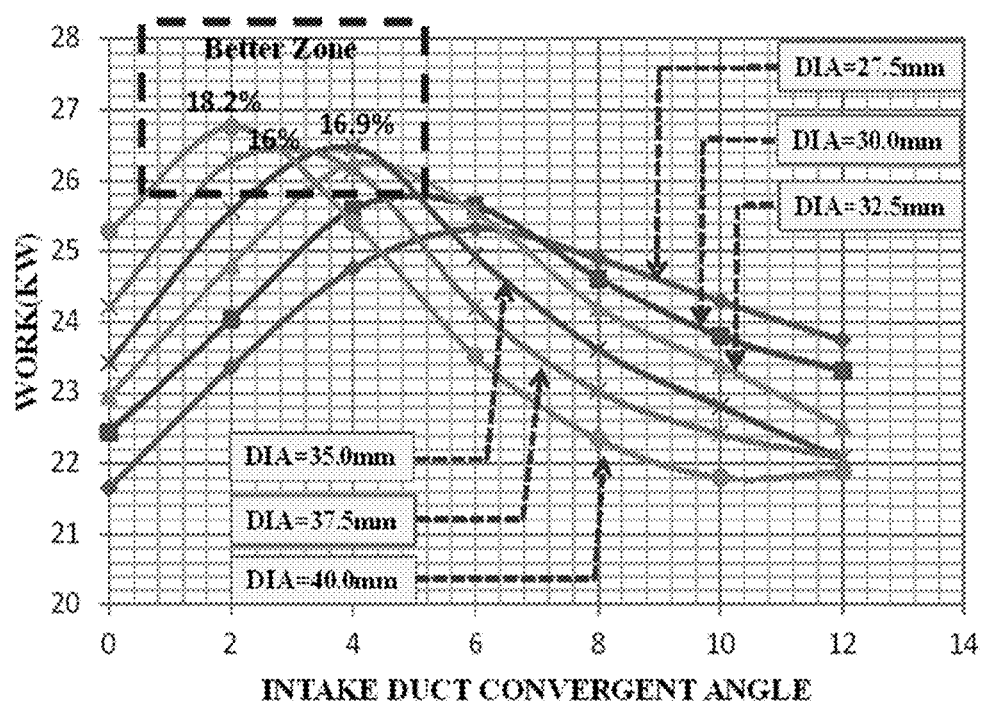

As shown in FIG. 8(a), the power output tends to peak at a longer length as the diameters are increased. A better zone appears at a range of diameters from 40 mm to 50 mm and lengths from 300 mm to 400 mm. In the better zone power output gains+14% to +16%. Also, as shown in FIG. 8(b), for the similar different intake diameter vs intake length, the BSFC is increased about 4% to 5%. Then, as shown in FIG. 8(c), the approach is to alternate the pipe diameter at the engine side over variation of intake convergent angle, or exhaust divergent angle at fixed pipe lengths of the benchmark. The results show that a smaller intake diameter has a work peak at larger convergent angle, and as enlarging the diameters, the peak goes toward left and seems to limit at a small region. The better zone falls at diameter of 35 to 40 mm with convergent angle 2° to 4° (+17% to +16% in work). That indicates that once the diameter is large enough, divergent angle will be of no advantages to the engine performance. The results for the exhaust pipe has the similar trend as mentioned above, thus it will not be repeated here for brevity. For the test results involving variations of the pipe length, pipe diameter, pipe shape, and pipe angle to increase power output, the related analyses can be conducted in the similar approach, and thus it will not be repeated here for brevity.

Figure 2:
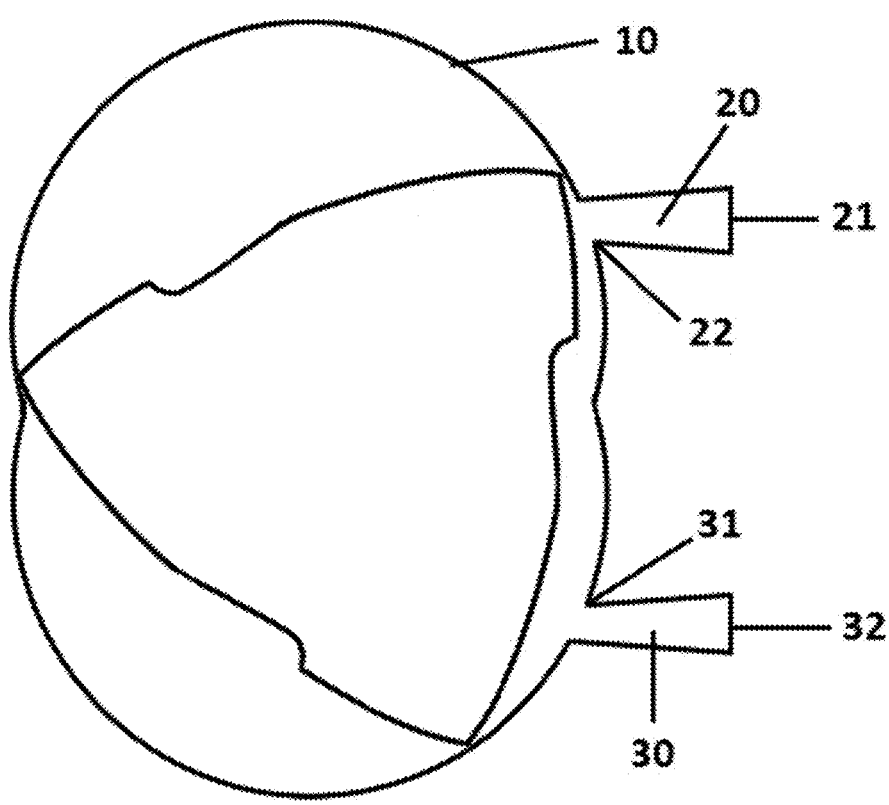
FIG. 2 is a schematic diagram of an intake/outlet pipe optimization rotary engine according to the present invention.

Further, in the present invention, the intake/outlet pipe optimization method for a rotary engine is realized through an intake/outlet pipe optimization rotary engine. In the following, refer to FIG. 2 for a schematic view of an intake/outlet pipe optimization a rotary engine according to the present invention, the rotary engine comprises: a rotary engine body 10, an intake pipe 20 and an outlet pipe 30. Wherein the intake pipe 20 is a tapered conical pipe having an air intake side 21 and an engine side 22, and the outlet pipe 30 an inversely tapered conical pipe having an engine side 31 and an outlet side 32. The intake pipe 20 is coupled to the engine side 22 of the rotary engine body 10, and the outlet pipe 30 is coupled to the engine side 31 of the rotary engine body 10, so that after air enters from the intake pipe 20 into the rotary engine body 10 to produce power, a waste gas is discharged from the outlet pipe 30.

Embodiment 1

Figure 3:
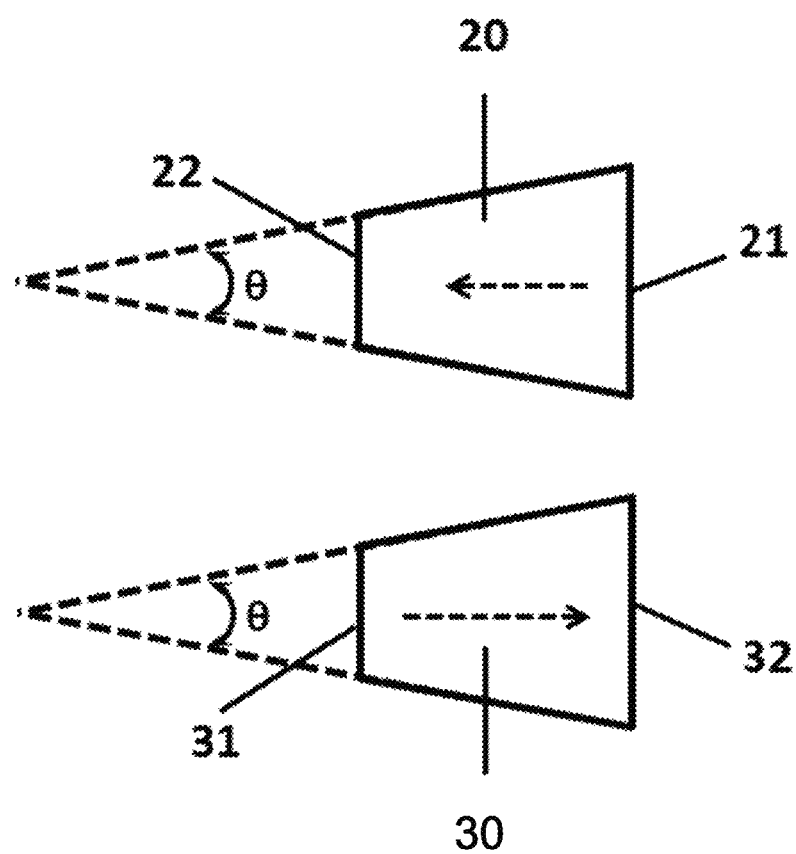
FIG. 3 is a schematic diagram showing the shape and angle of an intake/outlet pipe of a rotary engine according to the present invention.

Refer to FIGS. 3 and 4 for a schematic diagram showing the shape and angle of an intake/outlet pipe of a rotary engine according to the present invention; and a perspective view of an intake/outlet pipe optimization rotary engine according to the present invention. As shown in FIGS. 3 and 4, a rotary engine body 10 is provided, and the engine supplies a power of 32 horsepower with original intake/outlet (approximately equal to 22.37 KW) at 6800 revolutions per minute (rpm). The outlet pipe 30 geometry is fixed in length, diameter and pipe shape. The tapered intake pipe 20 has a pipe diameter of 31.5 mm at the engine side, 8-degree pipe taper angle, a pipe length variation from 50 mm-1000 mm, and an engine performance test is conducted to obtain a test result showing that the length of the intake pipe can affect the engine performance and peak at around 700 mm in length about 16.8%.

Embodiment 2

A rotary engine body 10 is provided, and the engine supplies a power of approximately 32 hp. Under a rotation speed of 6800 revolutions per minute (rpm), the pipe length, pipe diameter and pipe shape of the inversely tapered outlet pipe 30 are fixed, and the intake pipe 20 has a pipe length of 400 mm, a constant pipe taper angle of 2 degrees, and pipe diameter variation from 25 mm-40 mm at the engine side, and an engine performance test is conducted to obtain a test result showing that the diameter of the intake pipe can affect the engine performance and peak the output power by 16.9% at 35 mm in diameter.

Summing up the above, in the present invention, the rotary engine power output performance can be enhanced by a design that optimizes the pipe length, pipe diameter, pipe shape, and pipe angle of the intake/outlet pipe simultaneously, to provide an optimized combination of pipe length, pipe diameter, pipe shape, and pipe angle for various intake/outlet pipes of the rotary engine. The present invention is capable of improving the performance of a rotary engine over the conventional rotary engine having the same original horsepower output for only capable of changing its pipe length.

In addition, a further advantage of the present invention is that, through using the simulation software package of WAVE, the determination of the optimal combination of the pipe length, the pipe diameter, the pipe shape, and pipe angle, and an optimal power output for the rotary engine can be more accurate, efficient, and time saving. Since a series of trials and errors for obtaining the optimal power output can be skipped and omitted, and the correct results can be obtained in a very short period of time.

Further, in the present invention, through using the simulation software package of WAVE, since the pipe length, the pipe diameter, the pipe shape, and the pipe angle can be varied simultaneously in combinations, thus the rotary engine can be custom-made into different sizes to fit into the limited space of an installation site depending on actual space limitations, while still providing an optimized power output for the rotary engine. Therefore, the present invention does indeed fulfill the patent requirements and has patent value.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An intake/outlet pipe optimization method for a rotary engine, comprising the steps of:
   (A) providing a rotary engine;
   (B) providing a simulation software package, to perform a series of simulations for the rotary engine according to different combinations of a pipe length, a pipe diameter, a pipe shape and a pipe angle, to determine an optimal combination of the pipe length, the pipe diameter, the pipe shape, and pipe angle, to obtain an optimal power output for the rotary engine; and (C) performing tests for the rotary engine, by utilizing the optimal combination of the pipe length, the pipe diameter, the pipe shape, and pipe angle obtained in step (B), to obtain a test optimized power output for the rotary engine.

2. The intake/outlet pipe optimization method for a rotary engine as claimed in claim 1, wherein the simulation software package is a WAVE software product of Ricardo.

3. The intake/outlet pipe optimization method for a rotary engine as claimed in claim 1, wherein since the pipe length, the pipe diameter, the pipe shape, and the pipe angle are varied simultaneously in combinations, the rotary engine is custom made into different sizes to fit into a limited space of an installation site depending on actual space limitations, and still providing optimized power output for the rotary engine.

4. The intake/outlet pipe optimization method for a rotary engine as claimed in claim 1, wherein the pipe shape of the intake pipe is a tapered pipe shape, and the airflow direction is from the intake side with a relatively larger cross-sectional area to the engine side with a relatively smaller cross-sectional area.

5. The intake/outlet pipe optimization method for a rotary engine as claimed in claim 1, wherein the pipe shape of the outlet pipe is a tapered pipe shape, and the airflow direction is from the engine side with a relatively larger cross-sectional area to the outlet side with a relatively smaller cross-sectional area.

6. The intake/outlet pipe optimization method for a rotary engine as claimed in claim 1, wherein the pipe shape of the intake pipe and the pipe shape of the outlet pipe control the taper angle of the pipe, and the angle is an included angle between an open end of the pipe and the engine side.

7. The intake/outlet pipe optimization method for a rotary engine as claimed in claim 1, wherein the pipe angle control range is from 0 degree to 50 degrees, and the pipe angles have values of a plurality of intervals in between.

8. The intake/outlet pipe optimization method for a rotary engine as claimed in claim 1, wherein the pipe length control range is from 100 mm to 1500 mm, and the pipe length have values of a plurality of intervals in between.

* * * * *